(12) United States Patent
Nunnally et al.

(10) Patent No.: US 11,769,896 B2
(45) Date of Patent: Sep. 26, 2023

(54) MAGNETIC FLOW BATTERY

(71) Applicant: PwrJoule LLC, Galveston, TX (US)

(72) Inventors: William Charles Nunnally, Galveston, TX (US); Bret Alan Raymis, Yuma, AZ (US); Dwaine Kenton Coates, Joplin, MO (US)

(73) Assignee: PwrJoule LLC, Galveston, TX (US)

( * ) Notice: Subject to any disclaimer, the term of this patent is extended or adjusted under 35 U.S.C. 154(b) by 0 days.

(21) Appl. No.: 17/397,974

(22) Filed: Aug. 9, 2021

(65) Prior Publication Data

US 2021/0367257 A1     Nov. 25, 2021

Related U.S. Application Data

(63) Continuation-in-part of application No. PCT/US2020/028545, filed on Apr. 16, 2020.

(60) Provisional application No. 63/062,693, filed on Aug. 7, 2020, provisional application No. 62/882,513, filed on Aug. 3, 2019, provisional application No. 62/882,502, filed on Aug. 3, 2019, provisional application No. 62/834,669, filed on Apr. 16, 2019.

(51) Int. Cl.
| | |
|---|---|
| *H01M 8/22* | (2006.01) |
| *H01M 8/04186* | (2016.01) |
| *H01M 50/449* | (2021.01) |
| *H01M 8/18* | (2006.01) |

(52) U.S. Cl.
CPC ....... *H01M 8/225* (2013.01); *H01M 8/04186* (2013.01); *H01M 8/184* (2013.01); *H01M 50/449* (2021.01)

(58) Field of Classification Search
None
See application file for complete search history.

(56) References Cited

U.S. PATENT DOCUMENTS

| | | | | |
|---|---|---|---|---|
| 4,565,748 | A * | 1/1986 | Dahl | .............. F04D 33/00 429/10 |
| 2018/0277868 | A1* | 9/2018 | Loretz | .............. H01M 8/188 |
| 2018/0364311 | A1* | 12/2018 | De Breucker | ....... G01R 31/367 |

* cited by examiner

Primary Examiner — Carmen V Lyles-Irving
(74) Attorney, Agent, or Firm — Georgios A. Georgakis (57) ABSTRACT

A system and method including an ion transfer cell including a first side and a second side separated by an ion-permeable membrane. A first flow channel is included on the first side, where the first flow channel includes a first liquid electrolyte slurry, where the first liquid electrolyte slurry comprises first particles, where the first particles are configured to accept or deploy at least one electron-ion pair. A first electrode is included within the first electrode flow channel, where the first electrode is along and in substantial contact with the ion-permeable membrane, where the first electrode is configured to facilitate a flow of ions through the first electrode to and from the first particles and the ion-permeable membrane. The first liquid electrolyte slurry is configured to flow through the first electrode flow channel in one of two opposite directions across the first electrode.

18 Claims, 9 Drawing Sheets

MAGNETIC FLOW BATTERY

A. PRIORITY CLAIMS/INCORPORATIONS BY REFERENCE

This application claims the benefit of:

U.S. Provisional Application No. 63/062,693, filed 7 Aug. 2020, titled "Magnetic Particle Flow Battery Inverted Electrodes," and naming Nunnally, et al. as inventors.

PCT Application No. PCT/US20/28545, filed 16 Apr. 2020, titled "Magnetic Particle Flow Battery," and naming Nunnally, et al. as inventors, which claims priority from the following three provisional patent applications:

U.S. Provisional Application No. 62/882,513, filed 3 Aug. 2019, titled "Electrodes for Flow Batteries," and naming Nunnally, et al. as inventors.

U.S. Provisional Application No. 62/882,502, filed 3 Aug. 2019, titled "Inherene Magnetic Particles for Flow Batteries," and naming Nunnally, et al. as inventors.

U.S. Provisional Application No. 62/834,669, filed 16 Apr. 2019, titled "Magnetic Particle Flow Battery," and naming Nunnally, et al. as inventors.

All the above-referenced patent applications are hereby incorporated by reference herein in their entirety.

B. BACKGROUND

The invention relates generally to energy storage systems and more particularly to particle flow batteries.

C. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

D. DETAILED DESCRIPTION

Figure 1:
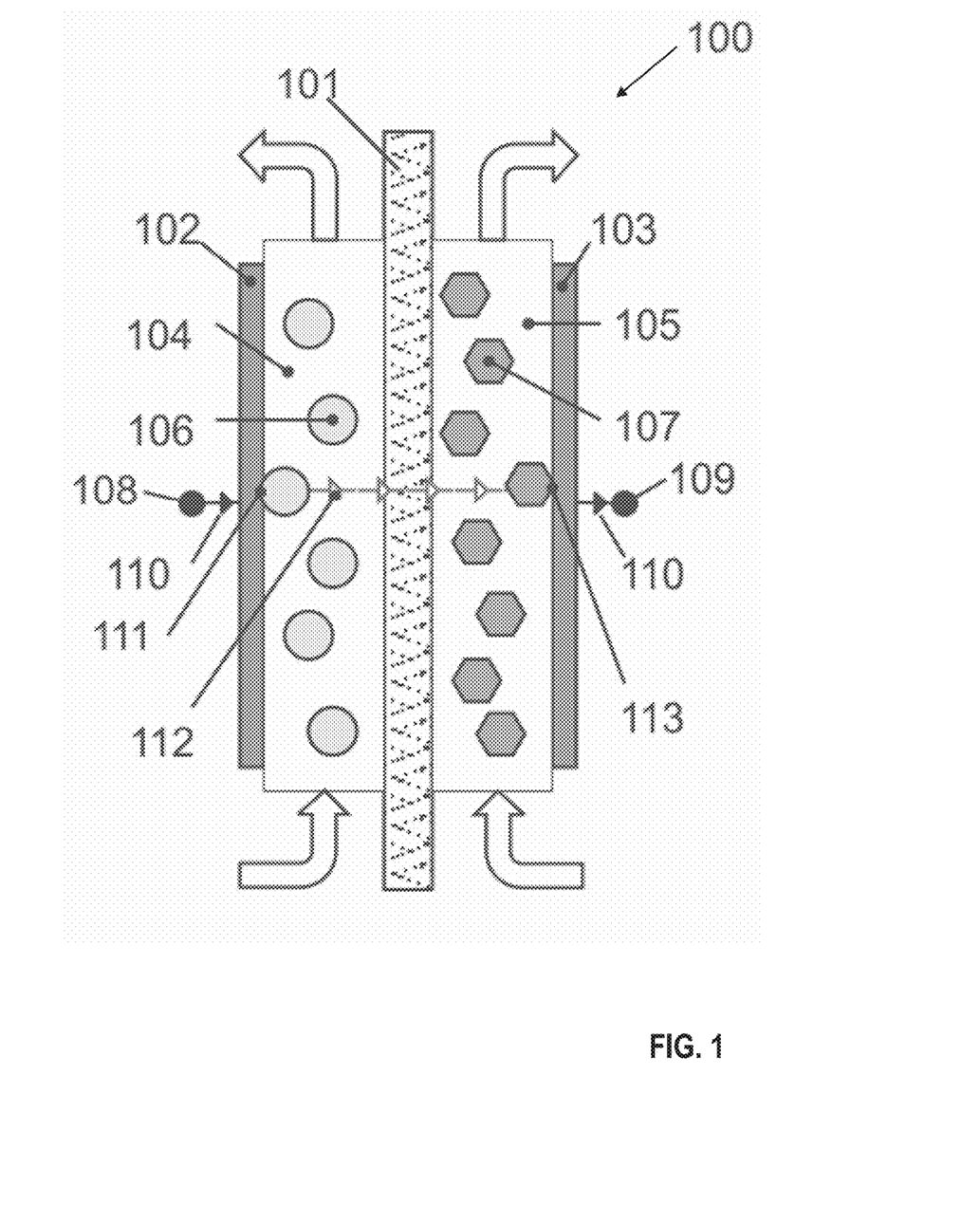
FIG. 1 is a perspective view of a flow battery, in accordance with some embodiments.

FIG. 1 is a perspective view of a flow battery, in accordance with some embodiments.

The various implementations shown, in some embodiments, generally overcome some limitations of large energy batteries. Though in some of these embodiments lithium-ion chemistries are shown as examples, it should be noted that these and other similar embodiments may be implemented using different types of chemistry.

Typically, a battery stores electrochemical energy by separating an ion source and an ion sink at differing ion electrochemical potential. A difference in electrochemical potential produces a voltage difference between the positive and negative electrodes; this voltage difference will produce an electric current if the electrodes are connected by a conductive element. In a battery, the negative electrode and positive electrode are connected by two conductive elements in parallel. Typically, the external element conducts electrons only, and the internal element (electrolyte) conducts ions only. Because a charge imbalance may not be sustained between the negative electrode and positive electrode, these two flow streams supply ions and electrons at the same rate. In operation, the electronic current may be used to drive an external device.

Typically, a rechargeable battery may be recharged by application of an opposing voltage difference that drives electronic current and ionic current in opposite directions compared to the flow directions of a discharging battery. The active materials of rechargeable batteries accept and provide ions. Increased electrochemical potentials produce larger voltage differences the cathode and anode, and increased voltage differences increase the electrochemically stored energy per unit mass of the device. For high-power devices, the ionic sources and sinks may be connected to the separator by an element with large ionic conductivity, and to the current collectors with high electronic conductivity elements.

In some embodiments, rechargeable batteries may be constructed using static negative electrode/electrolyte and positive electrode/electrolyte media. In such cases, non-energy storing elements of the device comprise a fixed volume or mass fraction of the device, which may decrease the device's energy and power density. The rate at which current may be extracted may also be limited by the distance over which cations may be conducted. Power requirements of static cells may constrain the total capacity by limiting device length scales.

In some embodiments, Redox Flow Batteries (RFBs), also known as a flow cells or redox batteries or reversible fuel cells are energy storage devices in which the positive and negative electrode reactants are soluble ions in liquid solution that are oxidized or reduced during the operation of the cell. RFBs may employ two reversible redox couples in which liquid state redox reactions are carried out when metal ions contact the positive and negative electrodes. Conductive mesh or porous electrodes may be disposed between the current collector electrodes and the ion-permeable membrane on both sides of the cell to increase the probability of metal ion or particle contact with the electrodes.

In some embodiments, a flowable semi-solid or condensed liquid ion-storing redox composition that can take up or release the ions during operation of the cell is employed to increase the power rating of the flow device.

A redox flow cell typically has a power-generating assembly that includes at least an ionically transporting membrane separating the positive and negative electrode reactants (also called catholyte and anolyte respectively), and positive and negative current collectors (also called electrodes) that facilitate the transfer of electrons to the external circuit but do not participate in the redox reaction (i.e., the current collector materials themselves do not undergo Faradaic activity).

The electrode-active solutions in a flow battery are typically referred to as electrolytes, and specifically as the catholyte and anolyte, in contrast to the practice in lithium-ion batteries where the electrolyte is solely the ion transport medium and does not undergo Faradaic activity. In some flow batteries, the non-electrochemically active components at which the redox reactions take place and electrons are transported to or from the external circuit are known as electrodes, whereas in a conventional primary or secondary battery such as a lithium-ion battery, they are known as current collectors.

In some embodiments, the structure of the cell consists of a positive cathode electrode (102) and a negative anode electrode (103) on opposite sides of an ion-conductive membrane (101). A cathode slurry (104) of electrolyte and cathode active material particles (106) is made to flow in a cathode active channel between the cathode electrode (102) and the ion conductive membrane (101). An anode slurry (105) of electrolyte and anode active material particles (107) is made to flow in an anode active channel between the anode electrode and the ion conductive membrane (101).

In some embodiments, in charge mode of operation, as shown, the flow of the anode and cathode slurries through RFB structure results in active material particles randomly contacting their respective electrodes at point (111) on the cathode side and (113) on the anode side. The charging voltage, exceeding the cell electro-chemical potential applied between to the cathode terminal (108) and the anode terminal (109) forces a redox reaction to occur resulting in the cathode particle ejecting an ion and an electron. The ejection of the electron and ion are evidenced by an electron current (110) and corresponding ion current (112). Ions are transported through the cathode slurry electrolyte (104), the ion-conducting membrane (101), the anode electrolyte (105) to an anode particle (107) that is in contact with the anode electrode (103) where another redox reaction takes place in which the anode particle accepts and ion from the electrolyte (105) and an electron from the anode electrode (103). In some embodiments, conductive mesh or porous electrodes may be employed in breach of the active zones between the electrodes (102) or (103) and the membrane (101) through which the slurries (104) and (105) flow to increase the efficiency of particle-electrode contact.

In some embodiments, electrical energy may be stored in the high rate, high energy density flow battery by transferring an ion from the cathode particle (106) through the ion conductive cathode electrolyte (104), the separator membrane (101) and the ion conductive anode electrolyte (105) to an anode particle (107) indicated as ion current (112).

In some embodiments, ions are released from cathode particles (106) when a cathode particle (106) contacts the cathode electrode (102) at point (111) to transfer a charge balancing electron to the cathode electrode (102). Cathode particle (106) contact with the cathode electrode (102) is dependent on the particle intersecting the electrode during slurry transit through the flow cell. The ions released from cathode particles (106) are transported across the cell to be accepted by an anode particle (107) that contacts the anode electrode (103) at point (113) to transfer a charge balancing electron to the cathode electrode (103). Anode particle (107) contact with the anode electrode (103) is dependent on the particle intersecting the electrode during slurry transit through the flow cell. In some embodiments, conductive particles may be added to the slurries to increase the efficiency of electron transfer to the electrodes.

In some embodiments, magnetically enhanced redox flow devices are described including a positive electrode current collector and a negative electrode current collector configured to produce a magnetic field at the electrode surfaces due to the electrochemical cell current. The positive and negative electrode current collectors are positioned in intimate contact with an ion-conductive membrane separating said positive and negative electrode current collectors. Positive electrode and negative electrode slurries of magnetically susceptible ion host particles that can take up or releasing ions during operation of the cell are made to flow adjacent to and along the positive and negative current collector electrodes. The cell current produced magnetic fields at the electrode surfaces attract the magnetically susceptible particles in their respective slurry flows to contact the electrode conductors to enhance the electron to electrode transfers corresponding to particle ion transfers to maintain particle charge neutrality.

In some embodiments, the magnetic susceptibility of the anode and cathode slurries are employed to move the slurries along the flow channels, to minimize parasitic losses found in conventional batteries, and to control the particle density in storage volumes.

Figure 2:
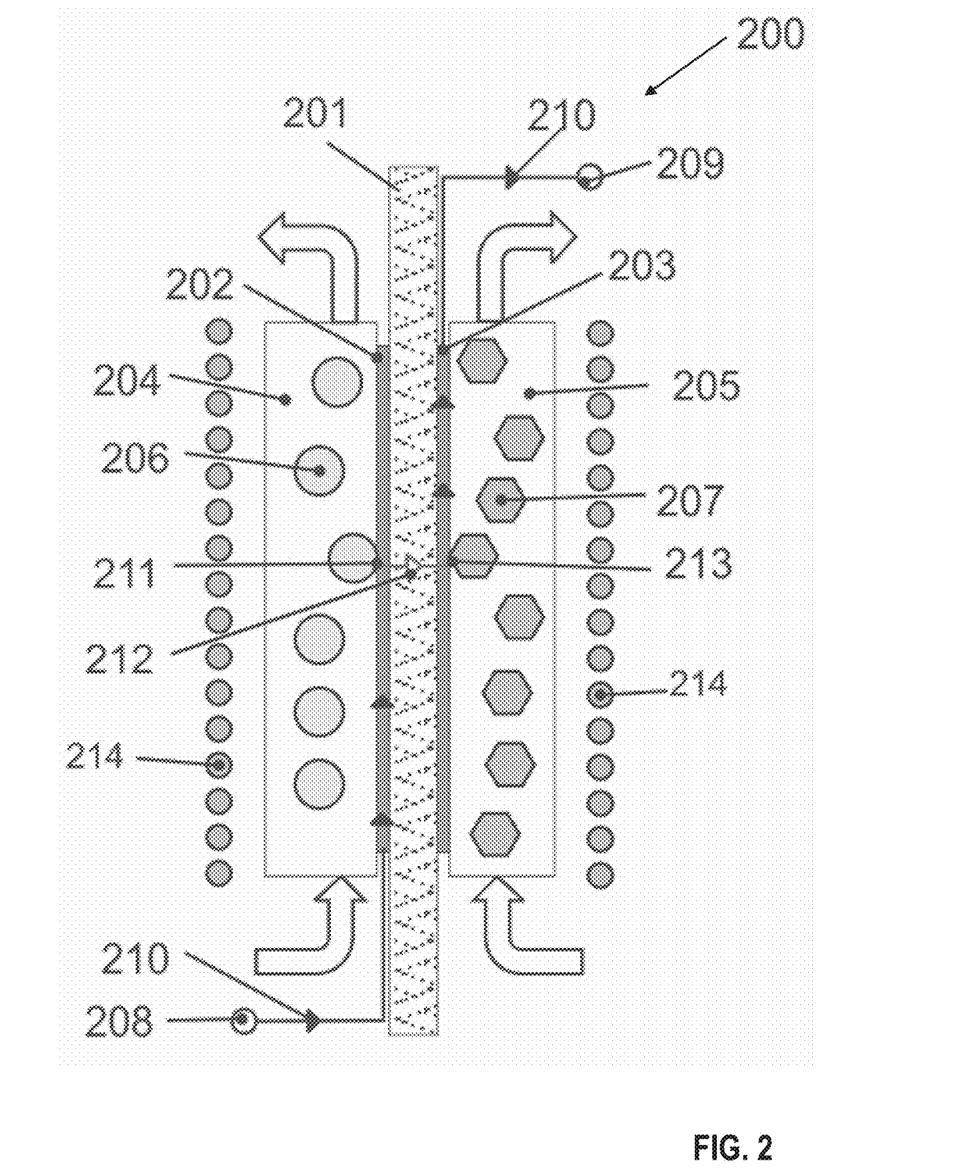
FIG. 2 is a perspective view of a magnetic flow battery ion transfer cell, in accordance with some embodiments.

FIG. 2 is a perspective view of a magnetic flow battery ion transfer cell, in accordance with some embodiments.

Magnetic Flow Battery (MFB) Ion Transfer Cell (ITC) 200 is depicted here in charging mode. In some embodiments, ITC 200 comprises a positive (cathode) electrode (202) and a negative (anode) electrode (203) in substantial contact with and separated by an ion conductive membrane (201). ITC 200 also comprises a cathode slurry consisting of a liquid (204) and particles (206) configured to take up or release the ions during operation of the cell. The liquid 204 is configured to flow along and adjacent to and in contact with the positive electrode (202). ITC 200 also comprises an anode slurry consisting of a liquid (205) and particles (207) configured to take up or release the ions during operation of the cell. The liquid 205 is configured to flow adjacent to and in contact with the negative electrode (203).

In some embodiments, the ITC cathode terminal (208) is connected to the positive electrode (202) and the and the anode terminal (209) is connected to the negative electrode (203) in such a way to produce a magnetic field at the surface of positive electrode (202) and the negative electrode (203) due to the ITC electron current (210). In some embodiments, the electrode path with respect to the slurry flow path is designed to maximize the magnetic field at the electrode surfaces.

In some embodiments, electrical energy is stored in the Magnetic Flow Battery by transferring an ion from a cathode particle (206) through the ion conductive membrane (201) to an anode particle (207) as illustrated by ion current (212). In store mode, ions are released from cathode particles (206) when a cathode particle (206) contacts the cathode electrode (202) at point (211) to transfer a charge balancing electron to the cathode electrode (202). Cathode particle's (206) contact with the cathode electrode (202) is enhanced by a generated magnetic field.

In some embodiments, the ions released from cathode particles (206) are transported across the cell to be accepted by an anode particle (207) that contacts the anode electrode (203) at point (213) to transfer a charge balancing electron to the cathode electrode (203). Anode particle (207) contact with the anode electrode (203) is dependent on the particle intersecting the electrode during slurry transit through the flow cell.

In some embodiments, the efficiency of cathode particle (206) contact to the cathode electrode (202) and contact of an anode particle (207) contact to the anode electrode (203) may be enhanced by the choice of particle materials as well as the cell current being configured to produce magnetic fields at the electrodes. Cathode particles (206) and the anode particles (207) are chosen from materials that have a large, inherent magnetic susceptibility and a large charge capacity measured in Amp-hour/gram (A-h/g) or Coulombs/gram (C/g). The magnetic energy density force attracting the particles to their respective electrode is proportional to the magnetic susceptibility of the particle and the magnetic field at the electrode surface.

In some embodiments, various different chemistries may be employed for the particles that have large, inherent magnetic susceptibility and large charge capacity. Iron Oxide and Ferrite materials may be used, for example, due to their large charge capacity and the large magnetic susceptibility. The magnetic susceptibility of a material is related to the relative permeability of the Iron Oxide materials by:

$$\mu = \mu_O \cdot \mu_R \cdot \mu_O \cdot (1 + \chi_m)$$

$\mu_O$ Permeability free space $\mu_r$ Material Relative Permeability $\chi_m$ Material Magnetic Susceptibility In some embodiments, Iron Oxide related materials may be used as Lithium-Ion hosts.

Ferrite materials are commonly stated as $XYFe_2O_4$ where "XY" signifies a divalent metal ion, e.g. $Fe^{2+}$, $Ni^{2+}$, $Mn^{2+}$, $Mg^{2+}$, $Zn^{2+}$, $Cu^{2+}$, $Co^{2+}$, or a combination elements with $Fe_2O_4$. For example, an anode particle material may be $Cu_xZn_yFe_2O_4$ and a cathode particle material may be Lithium Ferrite $LiFeO_4$. In some embodiments, nano-scale particles may be used due to their large surface area and the superior suspension of the particles in the slurries.

In some embodiments, the magnetic nature of the cathode particles (206) and the anode particles (207) may be used to control the direction and rate of slurry flows with a moving magnetic field. In some embodiments, a moving magnetic field may be produced by 3-phase conductors (214), which may be positioned perpendicularly to the slurry flow direction. For example, externally supplied three-phase currents in the conductors (214) may move the magnetic slurries along the flow channels of the Ion Transfer Cell. The direction of flow (which may depend on whether the cell is in store or recover mode) and the velocity of the flow may be determined by external control of the current phases.

In some embodiments, the magnetic nature of the cathode particles (206) and the anode particles (207) may be used to minimize parasitic losses in series connected cells by controlling the ion flow in the common volume.

In some embodiments, enhanced efficiency of the active material particles contacting the Flow Battery electrodes during slurry transit through the Ion Transfer Cell may be achieved at least in part by attracting the material particles to the electrodes with the cell current producing a magnetic field at the electrode surfaces and the magnetic susceptibility of the active particle materials. The Magnetic Flow Battery may be designed to transfer all available slurry ions across the Ion Transfer Cell in a single pass.

In some embodiments, increased energy density of the Flow Battery slurries may be achieved at least in part by the elimination of commonly added materials used to connect the active material particles to the electrodes. The Magnetic Flow Battery may employ mm scale, slurry flow thicknesses at velocities on the order of sub-cm/s to produce ampere currents in the base Ion Transfer Cell.

In some embodiments, increased efficiency of moving the ferro-fluid nano-scale slurries through the flow battery may be achieved at least in part by the reduction of the flow resistance compared to porous electrodes and the temporal control of the cell current magnetic field.

In some embodiments, increased safety associated with separating the energy storage volume component from the power storage component of the system may be achieved at least in part by having only a small fraction of the total stored energy available at any one time for interaction.

In some embodiments, increased safety may be achieved, despite the storing of large quantities of energy, at least in part by having the active material particles being charge neutral and being separated before and after Flow Battery transit.

In some embodiments, increased safety may be achieved at least in part by using slurry materials that eliminate the need for flammable and toxic slurry liquids at least in part due to the MFB electrode-membrane configuration in which the liquids are not responsible for ion conduction, but for active material transport.

In some embodiments, increased stability may be achieved at least in part by long-term storage made possible of the active materials particles being charge neutral and separated both before and after Ion Transfer Cell transit.

In some embodiments, reduced active materials purchase and fabrication cost may be achieved of energy storage materials and liquids at least in part due to the basic ion host cost. The nano-scale energy storage, active material particles may be fabricated using bulk liquid processes that are readily scalable to commercial volumes.

In some embodiments, reduced storage material cost may be achieved at least in part due to the elimination of conductive materials such as copper in the storage volume. About 400 lbs of copper may be used in storing one MW-h of energy in a Lithium-Ion type battery.

In some embodiments, reduction of the toxic nature of the storage materials may be achieved by eliminating the ion conductivity of the slurry transport liquids due to the electrode being in intimate contact with the ion conductive membrane.

In some embodiments, the Magnetic Flow Battery electrode and control system may be applicable to several energy storage chemistries with active materials being magnetically susceptible.

In some embodiments, increased density of energy storage may be achieved before and after slurry transit through the Flow Battery Ion Transfer Cell at least in part due to the reduction in transfer liquid volume by employing the magnetic properties of the active particle materials.

Figure 3:
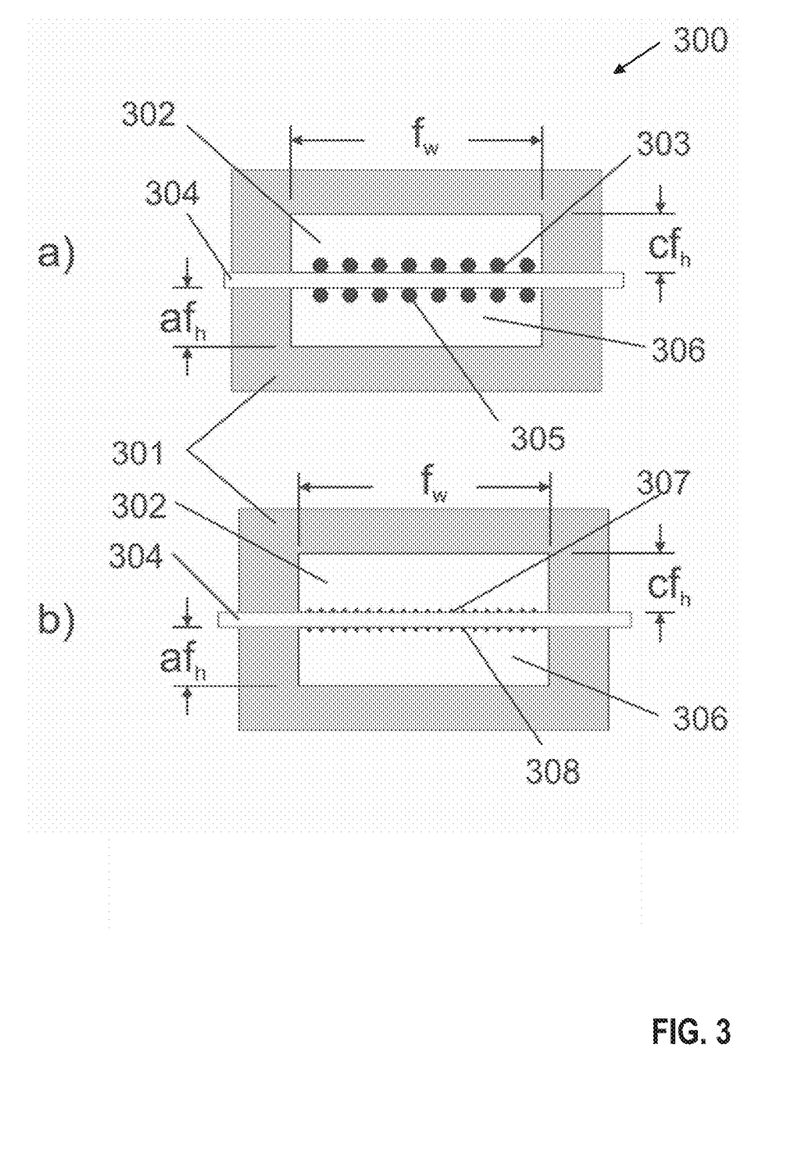
FIG. 3 is a cross sectional view of two magnetic flow battery base cells, in accordance with some embodiments.

FIG. 3 is a cross sectional view of two magnetic flow battery base cells, in accordance with some embodiments.

In some embodiments, cross sections a) and b) show two embodiments of a Base Ion Transfer Cell to illustrate the cell's basic flow properties. The base flow cell in the a) cross section consists of a flow containment structure (301) that forms a cathode flow channel (302) and an anode flow channel (306) on opposite sides of an ion conductive membrane (304). The cathode electrode (303) may be an array of small diameter conducting rods while the anode electrode (305) may be an array of small diameter conducting rods. The rod material is selected based on the chemistry being implemented.

In some embodiments, the base flow cell in cross section b) consists of a flow containment structure (301) that forms a cathode flow channel (302) and an anode flow channel (306) on opposite sides of an ion conductive membrane (304). The cathode electrode (307) may be a Graphene layer with high conductivity in the direction of the flow. Similarly, the anode electrode (308) may be a Graphene layer with high conductivity in the direction of the flow.

The flow channel height, cfh, and widths, fw, are used in Table 1 to illustrate the operation of the base cell.

In some embodiments, the MFB Base Ion Transfer Cell (BITC) may be the smallest electrochemical cell that may be replicated and connected in series-parallel combinations to obtain the desired system output voltage and current. The BITC may be designed to transfer most of the slurry ion charge during one transit through the cell in either the charge/store or the discharge/recover process. The charge flow rate in the anode and the cathode flow channels may be made equal (or effectively equal) to optimize the Ion transfer and thus the energy storage and recovery process.

In some embodiments, the base cell performance is dependent upon the rate at which slurry charge density is injected into the flow channels and the allowable electrode current conduction capability. The charge injection rates for the cathode and anode may be defined by:

$$\frac{dC_{QF}}{dt} = v_{FC} \cdot A_{FC} \cdot Q_{CS}$$

$C_{QF}$ Cathode Charge Flow
$V_{FC}$ Cathode Slurry Flow Velocity
$A_{FC}$ Cathode Flow Channel Area
$Q_{CS}$ Cathode Slurry Volume Charge Density and $$\frac{dA_{QF}}{dt} = v_{FA} \cdot A_{FA} \cdot Q_{AS}$$

$A_{QF}$ Anode Charge Flow
$V_{FA}$ Anode Slurry Flow Velocity
$A_{FA}$ Anode Flow Channel Area
$Q_{AS}$ Anode Slurry Volume Charge Density In some embodiments, the cathode and anode charge injection rates may be equalized by controlling the three factors of flow velocity, flow cross section, and slurry charge density. Furthermore, the charge injection rate for both anode and cathode equal the electrode current when all the available charge is transferred during ITC transit, or $$\frac{dA_{QF}}{dt} = \frac{dC_{QF}}{dt} = I_C = I_A = I_I$$

$I_C$ Cathode Electrode Current
$I_A$ Anode Electrode Current
$I_I$ Membrane Ion Current In some embodiments, high current capacity Graphene may be employed to provide the maximum electrode surface magnetic energy density due to the small current conduction dimensions and to make possible the extraction of the maximum current from the slurry flows which results in a very compact ITC.

An example of the Base Ion Transfer Cell (BITC) charge flow rate and the corresponding electrode current are calculated in the TABLE 1.

TABLE 1

Base Ion Transfer Cell Current-Slurry Flow Analysis

| Base ITC Parameters | | Cathode | Anode | Unit | Comments |
|---|---|---|---|---|---|
| Flow Height | $f_h$ | 0.1000 | 0.1000 | cm | |
| Flow Width | $f_w$ | 0.2000 | 0.1834 | cm | Variable to match A-K Currents |
| Flow Area | $A_f$ | 0.0200 | 0.0183 | cm$^2$ | |
| Flow Velocity | $v_f$ | 0.2000 | 0.2000 | cm/s | Equal Flow Velocity |
| Volume Flow Rate | $V_{dot}$ | 0.0040 | 0.037 | mL/s | |
| Slurry Volume Charge Density | $Q_v$ | 1800.00 | 1963.64 | Coul/cm$^3$ | |
| Charge Injection Rate | dQ/dt | 7.20 | 7.20 | Coul/s or A | A & K current (matched currents) |

Table 1 illustrates that large charge density iron oxide particles may produce a large electrode current that may produce a large magnetic field if the electrode conductor is high conductivity Graphene, in accordance with some embodiments. The slurry flow velocity may be used to control the maximum electrode current in concert with the slurry ratio of liquid to particle volumes.

In some embodiments, the conductivity of the MFB membrane may be an important parameter in determining the cell ionic resistance. The large electrode current density may be approximately equal to the membrane current density. In some embodiments, an MFB membrane may be preferred with high ion conductivity, on the order of 0.05 S/m, for example, and the thermal capacity to handle the significant ion currents. In some embodiments, the MFB membrane may be a ceramic, solid state, high conductivity membrane electrolyte.

Figure 4:
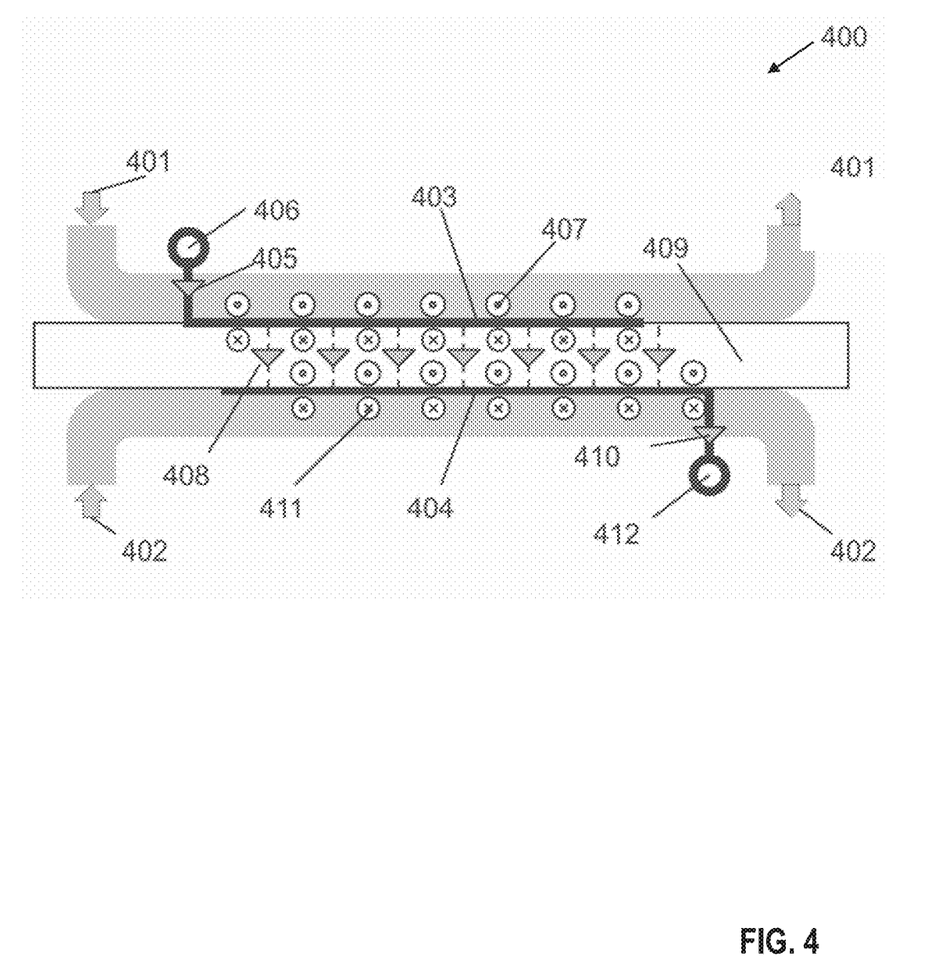
FIG. 4 is a perspective view of a magnetic flow battery showing cell current and magnetic field in charge and store modes, in accordance with some embodiments.

FIG. 4 is a perspective view of a magnetic flow battery showing cell current and magnetic field in charge and store modes, in accordance with some embodiments.

In some embodiments, the cell electron current may be employed to produce a magnetic field at the surface of the anode and the surface of the cathode as is illustrated here in a simplified Charge/Store Mode operation of an Ion Transfer Cell. The cathode slurry flows (401) along, adjacent to, and in contact with the cathode electrode (403) while the anode slurry flows (402) along, adjacent to, and in contact with the anode electrode (404).

In some embodiments, cell charge/store current (405) is injected into the cathode terminal (406) and flows along the cathode electrode (403) to produce the cathode magnetic field (407). As the electron current flows along the cathode electrode (403), electrons are exchanged for ions as cathode particles contact the cathode electrode (403), which may reduce the electron current (405) and may reduce the cathode magnetic field intensity (407). Ions (408) flowing across the ion conductive membrane (409) are exchanged for electrons as anode particles contact the anode electrode (404), which may increase the anode electron current (410) and may increase the anode magnetic field intensity (411) along the anode electrode, reaching a high value at the anode terminal (412). The cathode electron current (405) may be equal to the total Ion current (408) and the anode electron current (410). The input electron current (405) may be equal to the total ion current (408) and equal to the output electron current (410). The input electron current (405) flowing along the cathode electrode (403) may decrease as a function of distance from the input terminal (406) as the ion current (408) transfers to the anode electrode (404) such that the electrode magnetic field (407) at the end of the cathode electrode may be reduced.

In some embodiments, the variable magnetic field situation is addressed by the design of the magnetic electrode path with respect to the slurry flow channels. In some embodiments, the cell current may be employed to produce a magnetic field that is high at the surface of the anode electrode and the cathode electrode. The electrode terminal location, electrode geometry, and electrode path may be employed to optimize the production of magnetic field at the electrode surface. The magnetic flux density at the surface of a round conductor radius, r is determined by $$B(r) = \mu_0 \cdot H = \mu_0 \cdot \frac{I_C}{2 \cdot \pi \cdot r}$$

$\mu_0$ Permeability Free Space
$H$ Magnetic Field
$B$ Magnetic Flux Density
$r$ Radius of Conductor
$I_C$ Cell Current The largest magnetic flux density and thus the magnetic field energy density occurs at the surface of a small radius conductor. In some embodiments, the maximum surface magnetic field is limited by the current capacity of the conductive material which is determined by the material conductivity and material temperature parameters. For example, the fusing current for copper is approximately 80 A/mm² and may also be dependent upon the thermal environment of the application.

In some embodiments, the current capacity of the electrodes may be determined by the electron current that is equal to the ion current through the membrane. In some embodiments, the MFB electrode current density may be on the order of A/cm² while alternative design flow battery current densities may be on the order of 1-10 mA/cm².

In some embodiments, the MFB electrodes may be made of Graphene, which offers a current density on the order of 1000 time that of copper and the dimensions of a Graphene layer are on the order of 5 nanometers, both of which result in a very high magnetic field at the surface of the electrode.

Figure 5:
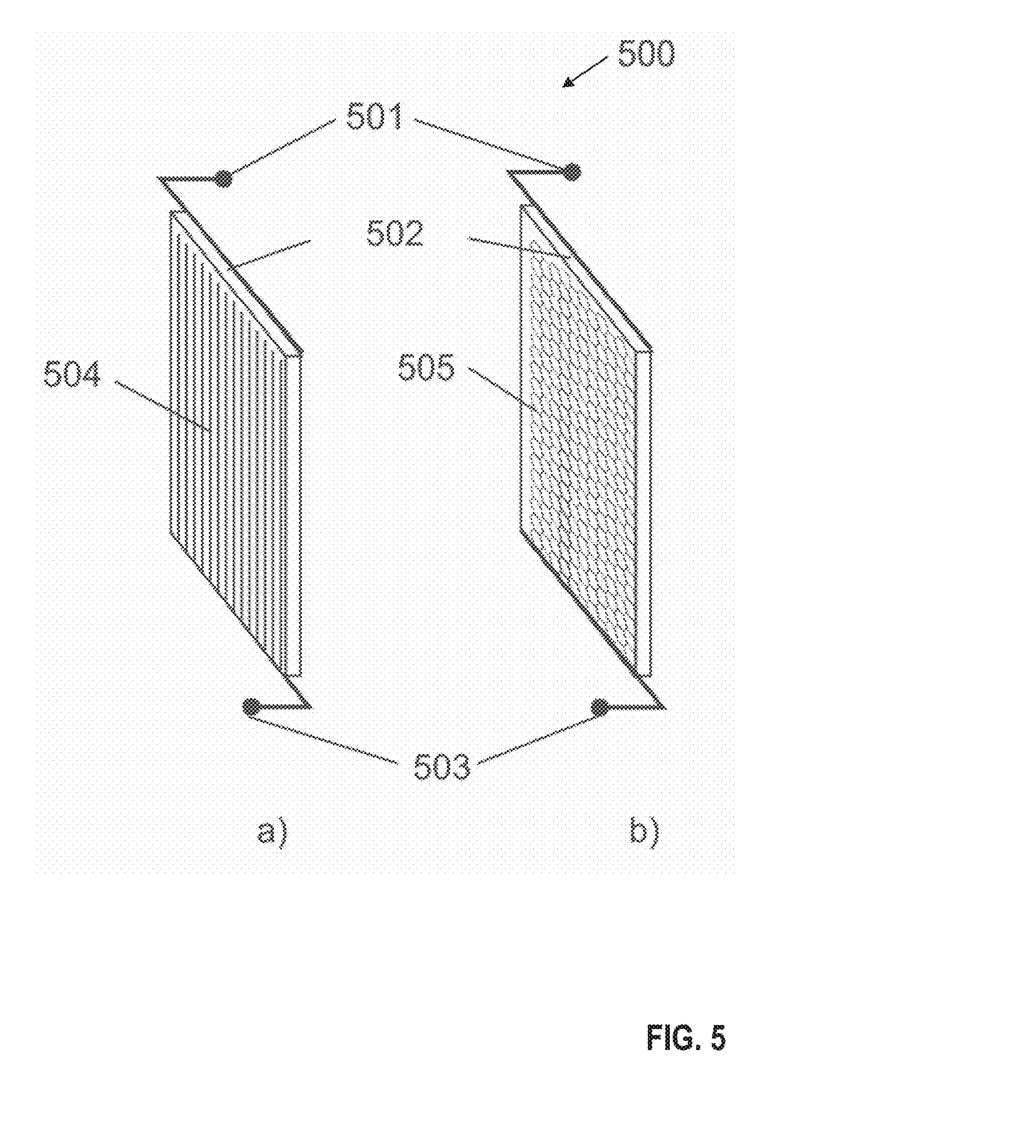
FIG. 5 is a perspective view of two electrode configurations for an ion transfer cell, in accordance with some embodiments.

FIG. 5 is a perspective view of two electrode configurations for an ion transfer cell, in accordance with some embodiments.

In some embodiments, two single-ended electrode-membrane-material configurations, a) and b), are illustrated in the figure. The electrode structures and terminals (501) and (503) may be symmetric due to the reversable nature of the cell current during store/recover cycles. The electrode structures may be in intimate contact with the cell membrane (502) on both of its sides. Configuration a) is an illustration of a small diameter rod electrode structure (504) while configuration b) is an illustration of a high conductivity Graphene electrode (505) structure. In both configurations, the cell electron current would enter terminal (501) and transfer through the membrane (502) as ion current along the electrode length and be recovered in the opposite side electrode structure to exit the cell at terminal (501). Note that the electrode structures may be double ended such that the electron current may flow in both directions from the center of the electrode structure.

Figure 6:
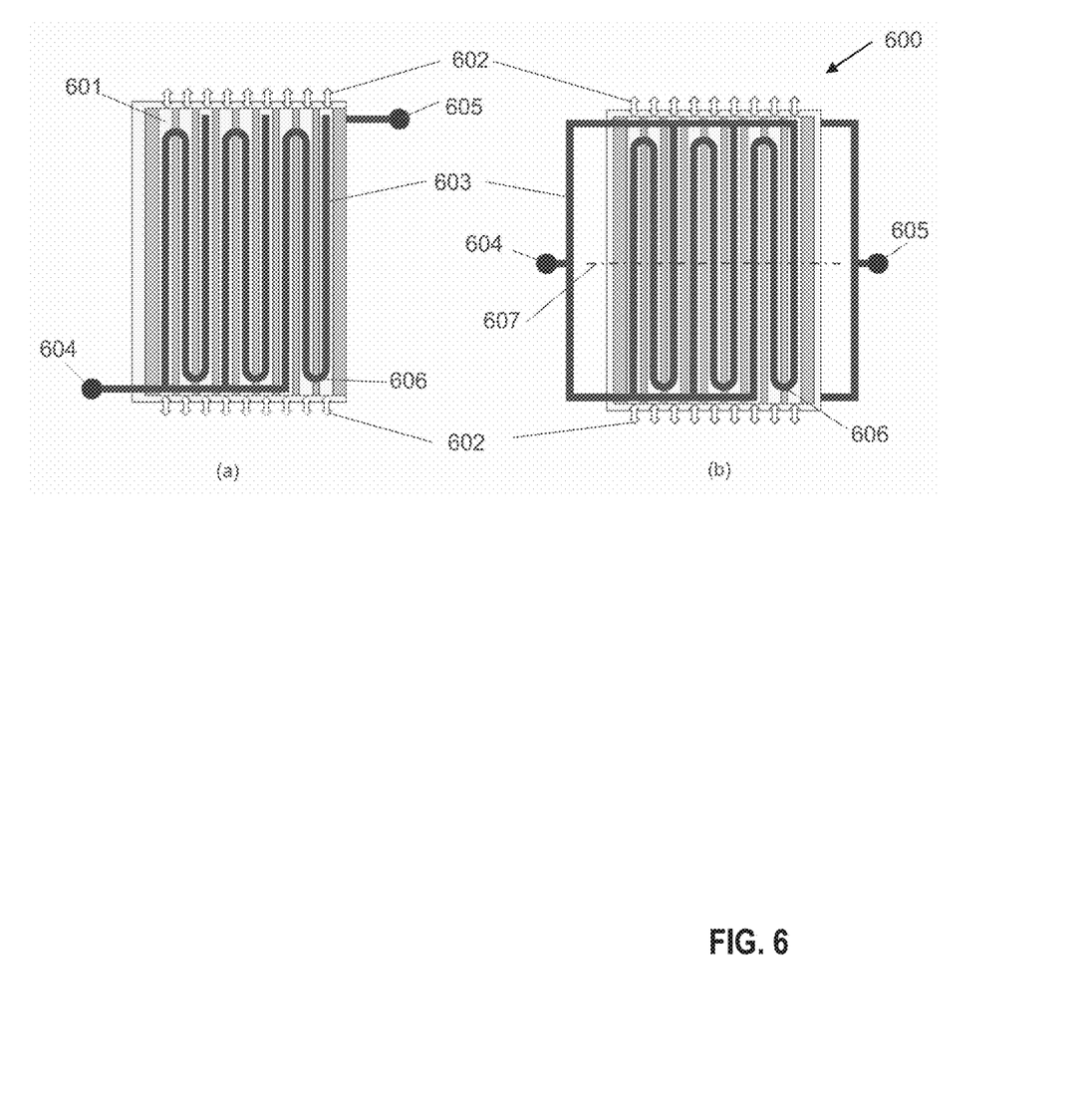
FIG. 6 is a perspective diagram of two electrode configurations in an ion transfer cell, in accordance with some embodiments.

FIG. 6 is a perspective diagram of two electrode configurations in an ion transfer cell, in accordance with some embodiments.

In some embodiments, the electro-chemical cell current may be employed to produce a magnetic field at the surface of the electrodes that attracts the cathode and anode particles to facilitate better contact with their respective electrode. Two configurations, a) and b), of the electrode patterns, and thus the current flow, are shown. The electron current as a function of position along the anode and cathode electrodes varies as a function of the position the ion current crosses the cell. This variation in electrode ion current results in a spatially varying magnetic field at the electrode surfaces. In some embodiments, the effect of the cell current magnetic field production and particle attraction may be increased by configuring the electrode path (603) relative to the flow channel paths (601). In some embodiments, the magnetic field varies as a function of the position along the slurry flow channel. In some embodiments, the electron current is routed from the cell terminal (604) to electrode paths (603) that traverse more than one flow channel by reversing the direction of the electrode path (605). In some embodiments, the uniformity of the magnetic field is increased along the slurry flow channels. Other embodiments similar designs may be implemented to further increase the uniformity of the magnetic field at the electrode surfaces. The electrode pattern (603) may be single-ended, or the electrode pattern may be double-ended such that the pattern and the current flow would be symmetric.

Figure 7:
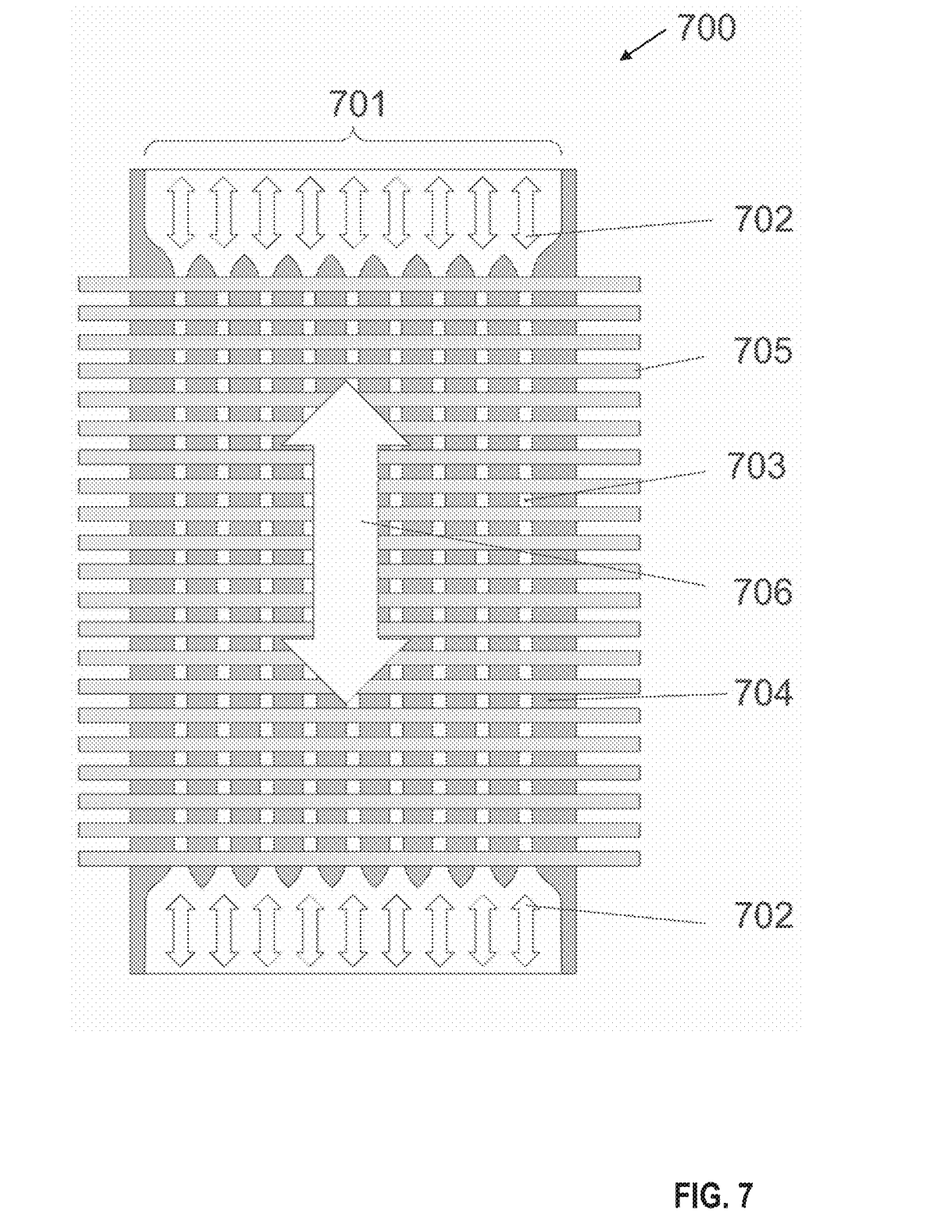
FIG. 7 is a perspective diagram showing the slurry flow channels in a magnetic flow battery, in accordance with some embodiments.

FIG. 7 is a perspective diagram showing the slurry flow channels in a magnetic flow battery, in accordance with some embodiments.

In some embodiments, the movement of nanoscale, magnetically susceptible particle slurries may be employed and controlled, including flow velocity, flow direction, and flow temporal profile, in an Ion Transfer Cell as illustrated in the figure. The Ion Transfer Cell (701) shown may consist of several parallel, small dimension (in the order of millimeters) slurry flow channels (703) in an insulating flow channel structure (704). The slurries may be made to flow along and in contact with the anode and cathode electrodes on each side of the ITC (701) membrane. An external, phase-controllable set of current sources may supply phase-controlled current to a repeating array of magnetic pump conductors (705) that, in some embodiments, are orthogonal to the slurry flow channels and cell electrodes to minimize electro-magnetic coupling. The multiple phase currents in the conductor array produce a moving magnetic field that moves the magnetic particles along the slurry channels in the direction required for both the store/charge mode and the recover/discharge mode.

Figure 8:
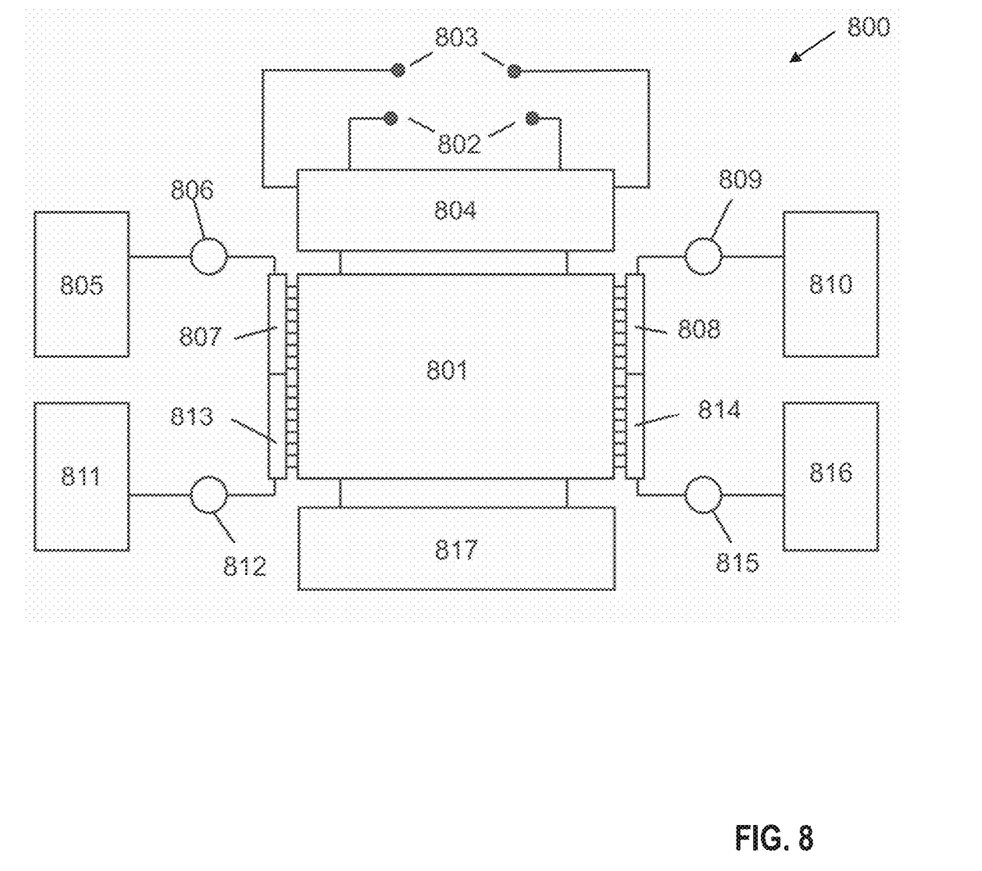
FIG. 8 is a block diagram of the magnetic flow battery energy storage system, in accordance with some embodiments.

FIG. 8 is a block diagram of the magnetic flow battery energy storage system, in accordance with some embodiments.

In some embodiments, an assembly of Base Ion Transfer Cells (ITC) (801) may be connected in series-parallel connections and designed accordingly to store/charge and recover/discharge electrical energy at a specified desired power level (with desired voltage and current). Electrical energy may be supplied to the ITC Assembly (801) via input terminals (802). The electrical energy may be supplied as voltage and current pulses by the switching power electronics system (804) to the ITC Assembly.

In some embodiments, in the store/charge mode of operation:
- Cathode slurry with ions from the Cathode(+) storage tank (805) are transferred to the Cathode(+) manifold (807) by the bi-directional Cathode(+) slurry pump (806).
- Anode slurry without ions from the Anode(−) storage tank (811) are transferred to the Anode(−) manifold (813) by the bi-directional Anode (−) slurry pump (812).
- The Magnetic pump current control system (817) is energized to move the slurries into and through the ITC assembly channels.
- As the slurries move through the ITC flow Assembly (801) channels ions are transferred from the Cathode(+) slurry to the Anode(−) slurry. The Cathode(−) slurry without ions leaves the ITC assembly (801) via the Cathode(−) manifold (808) and the Anode(+) slurry with ions leaves the ITC assembly (801) via the Anode (+) manifold (814).
- Cathode(−) slurry without ions is transferred to the Cathode(−) storage tank (810) by the bi-directional Cathode (−) slurry pump (809).
- Anode(+) slurry with ions is transferred to the Anode(+) storage tank (816) by the bi-directional Anode(−) slurry pump (815).
- Energy is stored in the ions that have been transferred from the cathode slurry to the anode slurry.

In the recover/discharge mode of operation the direction of flow of the slurries is reversed and the ions are transferred from the Anode slurry to the Cathode slurry.

Figure 9:
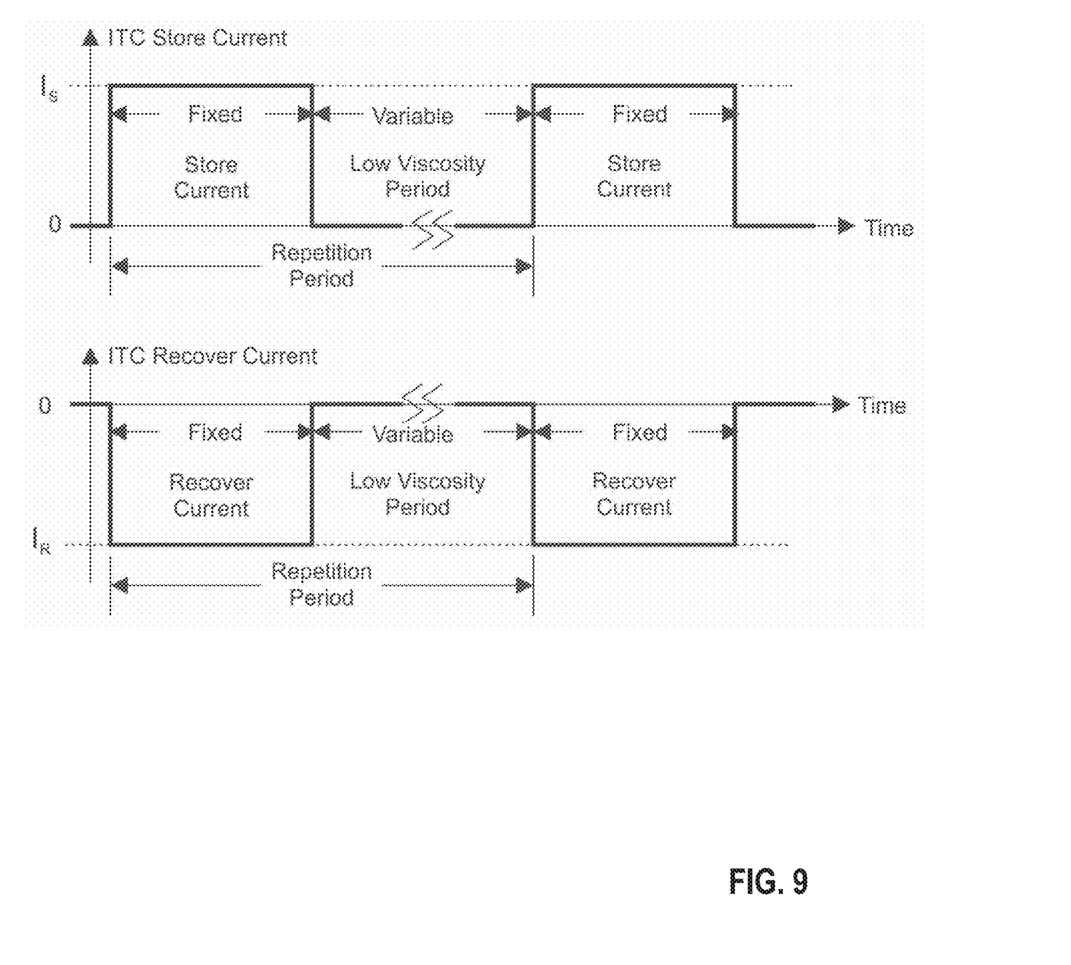
FIG. 9 is a graph showing examples of store current and recover current in a magnetic flow battery, in accordance with some embodiments.

FIG. 9 is a graph showing examples of store current and recover current in a magnetic flow battery, in accordance with some embodiments.

In some embodiments, the Magnetic Flow Battery may employ nano-scale particle slurries that are categorized as ferro-fluids that experience a change in viscosity of several orders of magnitude in the presence of a magnetic field. As such, the input and output cell currents and voltages may be controlled during store/charge and recover/discharge operations by switching power electronic systems. Examples of cell currents are illustrated by the waveforms in the figure.

In some embodiments, the MFB power input and output control (804) is a pulsed system that is designed to operate at a specific power level with the average power level determined by the pulse repetition rate as illustrated in the figure. The power and thus voltage and current are determined by the ITC Assembly (801). In the store/charge mode, the power electronics control system (804) provides an input voltage for a fixed pulse length that is determined by the time it takes for the slurry particles to move to the electrodes due to the magnetic field produced by the current. During the variable time between cell current pulses, the current may be low or zero and thus the magnetic field may be absent. As such, the ferro-fluid slurries may be moved along the Ion Transfer Cell flow channels.

In some embodiments, the Magnetic Flow Battery average store/charge and recover/discharge power level is determined by the pulse repletion rate. The Ion Transfer Cell capacitance provide the initial cell current that is increased by the active material particles that are magnetically attracted to the electrodes.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An ion transfer cell comprising:
   - a first side and a second side separated by an ion-permeable membrane, wherein one of the first side and the second side is an anode, and wherein the other one of the first side and the second side is a cathode;
   - a first flow channel on the first side, wherein the first flow channel comprises a first liquid electrolyte slurry, wherein the first liquid electrolyte slurry comprises first particles, wherein the first particles are configured to accept or deploy at least one electron-ion pair;
   - a first electrode in the first flow channel, wherein the first electrode is in contact with the ion-permeable membrane, wherein the first electrode is configured to be coupled to an electrical load or to an electrical power source;

a first set of conductors on the first side generating a first moving magnetic field wave based at least in part upon currents flowing through the first set of conductors,
wherein the first liquid electrolyte slurry flows through the first flow channel in one of two opposite directions in contact with the first electrode,
wherein the first particles are magnetically susceptible,
wherein the first particles in contact the first electrode based at least in part on the first electrode generating an attractive magnetic field, wherein the attractive magnetic field is being generated based at least in part on a current flowing through the first electrode,
wherein the first liquid electrolyte slurry flows through the first channel based at least in part upon the first particles being moved by the first moving magnetic field wave, and wherein a direction and a rate of flow of the first liquid electrolyte slurry through the first channel is controlled based at least in part upon controlling properties of the currents flowing through the first set of conductors,
wherein the first particles, based at least in part on the first particles contacting the first electrode:
accept or deploy at least one electron that is conducted by the first electrode, and
accept or deploy at least one ion that flows through the first electrode and the ion permeable membrane from or to the second side,
a second flow channel on the second side, wherein the second flow channel comprises a second liquid electrolyte slurry, wherein the second liquid electrolyte slurry comprises second particles, wherein the second particles are configured to accept or deploy at least one electron-ion pair;
a second electrode in the second flow channel, wherein the second electrode is in contact with the ion-permeable membrane, wherein the second electrode is configured to be coupled to an electrical load or to an electrical power source;
a second set of conductors on the second side generating a second moving magnetic field wave based at least in part upon currents flowing through the second set of conductors,
wherein the second liquid electrolyte slurry flows through the second flow channel in one of two opposite directions in contact with the second electrode,
wherein the second particles are magnetically susceptible,
wherein the second particles contact the second electrode based at least in part on the second electrode generating an attractive magnetic field, wherein the attractive magnetic field is being generated based at least in part on a current flowing through the second electrode,
wherein the second liquid electrolyte slurry flows through the second channel based at least in part upon the second particles being moved by the second moving magnetic field wave, and wherein a direction and a rate of flow of the second liquid electrolyte slurry through the second channel is controlled based at least in part upon controlling properties of the currents flowing through the second set of conductors,
wherein the second particles, based at least in part on the second particles contacting the second electrode:
accept or deploy at least one electron that is conducted by the second electrode, and
accept or deploy at least one ion that flows through the second electrode and the ion permeable membrane from or to the first side.

2. The ion transfer cell of claim 1, wherein the first electrode and second electrodes facilitate a flow of ions through the first electrode and through the second electrode to and from the first particles and the second particles and the ion-permeable membrane.

3. The ion transfer cell of claim 1, wherein the first particles and the second particles are coupled to an electrical load or to an electrical power source based at least in part on whether energy is being recovered or stored.

4. The ion transfer cell of claim 1, wherein a first electrical connection to the first electrode and a second electrical connection to the second electrode are located on opposite sides and opposite ends of the first flow channel and the second flow channel.

5. The ion transfer cell of claim 1, wherein the currents flowing through the first conductors and the second conductors are 3-phase currents.

6. The ion transfer cell of claim 1, comprising a power controller pulsing the current through the first electrode and the current through the second electrode, wherein the first particles and the second particles are either attracted to the first electrode and the second electrode during a higher current of the pulse or flow through the first channel and the second channel during a lower current of the pulse.

7. The ion transfer cell of claim 1, wherein one of the first electrode and the first flow channel and the second electrode and the second flow channel is an anode electrode and an anode flow channel and the other one is a cathode electrode and a cathode flow channel.

8. The ion transfer cell of claim 1, comprising a first bidirectional pump and a second bidirectional pump to pump the first liquid electrolyte slurry and the second liquid electrolyte slurry selectively in one of two opposite directions through the first flow channel and the second flow channel based at least in part on whether energy is being stored or recovered.

9. The ion transfer cell of claim 8, further comprising at least two first tanks and at least two second tanks for storing the first liquid electrolyte slurry and the second liquid electrolyte slurry in each of the two directions.

10. A method comprising:
causing a first liquid electrolyte slurry to flow through a first flow channel of an ion transfer cell in one of two opposite directions in contact with a first electrode,
wherein the first flow channel is comprised in a first side, wherein the first side is separated from a second side by an ion-permeable membrane, wherein one of the first side and the second side is an anode, and wherein the other one of the first side and the second side is a cathode;
wherein the first liquid electrolyte slurry comprises first particles, wherein the first particles are configured to accept or deploy at least one electron-ion pair;
wherein the first electrode is configured to be coupled to an electrical load or to an electrical power source, wherein the first electrode is in contact with the ion-permeable membrane,
generating a first moving magnetic field wave, using a first set of conductors on the first side, based at least in part upon generating currents through the first set of conductors,
wherein the first particles are configured to be magnetically susceptible, wherein the first particles are configured to contact the first electrode based at least in part on the first electrode being configured to generate an attractive magnetic field, wherein the attractive magnetic field is being generated based at least in part on a current flowing through the first electrode, wherein the first liquid electrolyte slurry flows through the first channel based at least in part upon the first particles being moved by the first moving magnetic field wave, and wherein a direction and a rate of flow of the first liquid electrolyte slurry through the first channel is controlled based at least in part upon controlling properties of the currents flowing through the first set of conductors, wherein the first particles are configured to, based at least in part on the first particles contacting the first electrode:

accept or deploy at least one electron that is configured to be conducted by the first electrode, and accept or deploy at least one ion that is configured to flow through the first electrode and the ion permeable membrane from or to the second side, causing a second liquid electrolyte slurry to flow through a second flow channel of the ion transfer cell in one of two opposite directions in contact with a second electrode, wherein the second flow channel is comprised in the second side;

wherein the second liquid electrolyte slurry comprises second particles, wherein the second particles are configured to accept or deploy at least one electron-ion pair;

wherein the second electrode is configured to be coupled to an electrical load or to an electrical power source, wherein the second electrode is in contact with the ion-permeable membrane, generating a second moving magnetic field wave, using a second set of conductors on the second side, based at least in part upon generating currents through the second set of conductors, wherein the second particles are configured to be magnetically susceptible, wherein the second particles are configured to contact the second electrode based at least in part on the second electrode being configured to generate an attractive magnetic field, wherein the attractive magnetic field is being generated based at least in part on a current flowing through the second electrode, wherein the second liquid electrolyte slurry flows through the second channel based at least in part upon the second particles being moved by the second moving magnetic field wave, and wherein a direction and a rate of flow of the second liquid electrolyte slurry through the second channel is controlled based at least in part upon controlling properties of the currents flowing through the second set of conductors, wherein the second particles are configured to, based at least in part on the second particles contacting the second electrode:

accept or deploy at least one electron that is configured to be conducted by the second electrode, and accept or deploy at least one ion that is configured to flow through the second electrode and the ion permeable membrane from or to the first side.

11. The method of claim 10, wherein the first electrode and second electrodes are configured to facilitate a flow of ions through the first electrode and through the second electrode to and from the first particles and the second particles and the ion-permeable membrane.

12. The method of claim 10, wherein the first particles and the second particles are coupled to an electrical load or to an electrical power source is based at least in part on whether energy is being recovered or stored.

13. The method of claim 10, wherein a first electrical connection to the first electrode and a second electrical connection to the second electrode are located on opposite sides and opposite ends of the first flow channel and the second flow channel.

14. The method of claim 10, wherein the currents flowing through the first conductors and the second conductors are 3-phase currents.

15. The method of claim 10, comprising causing a power controller to pulse the current through the first electrode and the current through the second electrode, wherein the first particles and the second particles are attracted to the first electrode and the second electrode during a higher current of the pulse or flow through the first channel and the second channel during a lower current of the pulse.

16. The method of claim 10, wherein one of the first electrode and first flow channel and the second electrode and the second flow channel is an anode electrode and an anode flow channel and the other one is a cathode electrode and a cathode flow channel.

17. The method of claim 10, comprising causing a first bidirectional pump and a second bidirectional pump to pump the first liquid electrolyte slurry and the second liquid electrolyte slurry selectively in one of two opposite directions through the first flow channel and the second flow channel based at least in part on whether energy is being stored or recovered.

18. The method of claim 17, comprising causing at least two first tanks and at least two second tanks to store the first liquid electrolyte slurry and the second liquid electrolyte slurry in each of the two directions.

* * * * *